United States Patent
Ng et al.

(10) Patent No.: US 6,473,499 B1
(45) Date of Patent: Oct. 29, 2002

(54) DYNAMIC INDIVIDUAL PHONE RATES

(75) Inventors: Ede-Phang Ng, Singapore (SG); Steven D. Edelson, Wayland, MA (US)

(73) Assignee: MediaRing.com Ltd., Singapore (SG)

( * ) Notice: Subject to any disclaimer, the term of this patent is extended or adjusted under 35 U.S.C. 154(b) by 0 days.

(21) Appl. No.: 09/522,307

(22) Filed: Mar. 9, 2000

Related U.S. Application Data

(60) Provisional application No. 60/124,230, filed on Mar. 12, 1999.

(51) Int. Cl.$^7$ .............................................. H04M 15/00
(52) U.S. Cl. ............................ 379/121.02; 379/121.04; 379/114.02; 379/114.1; 379/114.12; 379/130
(58) Field of Search ....................... 379/114.02, 114.06, 379/114.08, 114.09, 114.1, 114.12, 114.26, 121.04, 121.02, 121.05, 130, 126, 127.01, 127.03, 127.04, 127.05, 115.01, 114.29, 114.28; 455/405, 406, 407, 409

(56) References Cited

U.S. PATENT DOCUMENTS

| | | | | |
|---|---|---|---|---|
| 4,538,030 A | * | 8/1985 | Fossett et al. ............... | 379/114 |
| 4,888,822 A | | 12/1989 | Weinberger et al. ........ | 379/130 |
| 5,187,710 A | | 2/1993 | Chau et al. ............... | 370/110.1 |

(List continued on next page.)

OTHER PUBLICATIONS

Baker, D., Washburn, B., "Bill of Sales", America's Network, Apr. 1, 1997, pp. 17–19, and 22.

(List continued on next page.)

Primary Examiner—Rexford Barnie
(74) Attorney, Agent, or Firm—Fenwick & West LLP

(57) ABSTRACT

A system for determining an individual phone rate for a user from an originating device to a destination device comprises a user calling pattern information module, a destination gateway provider module, a margin multiplier calculator module, and an individual rate calculator module. The user calling pattern information module stores information about the user such as the destinations the user calls or desires to call frequently and the percentage of time the user calls or plans to call the frequently called destinations. Such information may be inputted directly from the user or may be determined from the user's historical billing records. The destination gateway provider information module stores information relating to the cost and profit margin of the provider servicing the connection to the destination device. For example, the destination gateway provider may store such information as the fixed cost for establishing a connection to the destination device as well as the normal margin for a call to the destination device. The margin multiplier calculator module determines a margin multiplier for a call by the user to the destination device. The individual rate calculator module uses the margin multiplier, the destination gateway provider information, and the user calling pattern information to determine a call rate to the destination for the user. In one embodiment, the call rate to the destination is determined by multiplying the margin multiplier with the normal margin for the call to the destination and adding the result to the fixed cost of the call to the destination.

7 Claims, 13 Drawing Sheets

U.S. PATENT DOCUMENTS

| | | | |
|---|---|---|---|
| 5,303,297 A | 4/1994 | Hillis | 379/63 |
| 5,400,395 A | 3/1995 | Berenato | 379/114 |
| 5,420,914 A | 5/1995 | Blumhardt | 379/114 |
| 5,425,085 A | 6/1995 | Weinberger et al. | 379/112 |
| 5,473,630 A | 12/1995 | Penzias et al. | 375/114 |
| 5,519,769 A | 5/1996 | Weinberger et al. | 379/112 |
| 5,553,131 A | 9/1996 | Minervino, Jr. et al. | 379/221 |
| 5,570,417 A | 10/1996 | Byers | 379/115 |
| 5,627,887 A | 5/1997 | Freedman | 379/144 |
| 5,638,433 A | 6/1997 | Bubien, Jr. et al. | 379/130 |
| 5,659,601 A | 8/1997 | Cheslog | 455/406 |
| 5,715,305 A | 2/1998 | Penzias et al. | 379/220 |
| 5,781,620 A | 7/1998 | Montgomery et al. | 379/115 |
| 5,790,642 A | 8/1998 | Taylor et al. | 379/112 |
| 5,793,854 A | 8/1998 | Kashepava | 379/130 |
| 5,799,071 A | 8/1998 | Azar et al. | 379/113 |
| 5,802,502 A | 9/1998 | Gell et al. | 705/37 |
| 5,822,414 A | 10/1998 | Reding et al. | 379/114 |
| 5,844,972 A | 12/1998 | Jagadish et al. | 379/114 |
| 5,862,339 A | 1/1999 | Bonnaure et al. | 395/200.57 |
| 5,878,122 A | 3/1999 | White et al. | 379/115 |
| 5,881,139 A | 3/1999 | Romines | 379/130 |
| 5,896,445 A * | 4/1999 | Kay et al. | 379/135 |
| 5,915,005 A | 6/1999 | He | 379/115 |
| 5,917,897 A | 6/1999 | Johnson et al. | 379/114 |
| 6,134,589 A * | 10/2000 | Hultgren | 370/351 |
| 6,199,047 B1 * | 3/2001 | Dimino et al. | 379/114 |

OTHER PUBLICATIONS

Seungjae, S., et al., "Case Study: How to Make Telecom Pricing Strategy Using Data Warehouse Approach", Proceedings of the Thirty–First Hawaii International Conference on System Sciences, vol. VI, Jan. 1998, pp. 55–60.

Strathmeyer, Carl R., ,"An Introduction to Computer Technology", IEEE Communications Magazine, May 1996, pp. 106–111.

Engerbretsen, Jenni R., "Find a Cheap Phone Plan on the Web", Money, May 1998, p. 148.

Wallace, Bob, "AT&T Gives Users Maximum Advantage", Network World, Aug. 9, 1993, p. 29.

O'Shea, Dan, "GTE Airfone Seeks Higher Altitude", Telephony, Nov. 18, 1996, p. 50.

Songhurst, D., Kelly, F., "Charging Schemes for Multiservice Networks", Teletraffic Contributions for the Information Age, Proceedings of the 15$^{th}$ International Teletraffic Congress Jun. 1997, vol. 2b, pp. 781–790.

Wray, Nicholas, "Negotiate Better Phone Rate", Datamation, Feb. 1998, pp. 79–81.

Concerning Home Telematics, Proceedings of the IFIP TC 9 Conference on Social implications of Home Interactive Telematics, Amsterdam, The Netherlands, Jun. 24–27, Jun. 1987, pp. 63–76.

* cited by examiner

DYNAMIC INDIVIDUAL PHONE RATES

RELATED APPLICATION

The subject matter of this application relates to and claims priority, under 35 U.S.C. §119(e), from provisional application No. 60/124,230, entitled "Dynamic Individual Phone Rates" by Ede Phang Ng, and Steven D. Edelson, which application was filed on Mar. 12, 1999, which is incorporated herein by reference in its entirety.

BACKGROUND

A. Technical Field

The present invention relates generally to the field of establishing communication rates for communication systems, and more specifically to a system and method for dynamically determining phone rates for an individual customer.

B. Background of the Invention

Phone consumers have many choices for long distance vendors as well as various options for alternative vendors for voice communications through satellite, cable operators, and internet telephony. Choosing the lowest cost carrier for a call is a difficult task involving predicting a calling pattern and matching the many calls against the complex rate plans of the different vendors to determine the lowest average cost. As a result, consumers often do a simple comparison on their more common call destinations and choose a carrier on this basis.

Many communication vendor pricing plans such as MCI Friends and Family™ and AT&T One Rate™ take advantage of this behavior. This type of pricing plan is not unique to the communication industry but is the rationale behind supermarket loss-leader advertising. However, such pricing plans are traditionally geared to the public in general or specific groups, or if individualized, was in the form of a specific exception to the rate plan.

The emergence of multiple transport and gateway vendors along with advances in billing technology, especially with pre-paid phones, allow highly individualized rate plans tailored to the calling pattern of the caller. Accordingly it is desirable to provide a system and method that can determine a telephone call rate for various destinations based on the calling patterns of a consumer.

SUMMARY OF THE INVENTION

The present invention overcomes the deficiencies and limitations of the prior art with a unique system and method for determining an individual phone rate for a user from an originating device to a destination device. The system for determining an individual phone rate for a user preferably comprises a user calling pattern information module, a destination gateway provider module, a margin multiplier calculator module, and an individual rate calculator module. The user calling pattern information module stores information about the user such as the destinations the user calls or desires to call frequently and the percentage of time the user calls or plans to call the frequently called destinations. Such information may be inputted directly from the user or may be determined from the user's historical billing records. The destination gateway provider information module stores information relating to the cost and profit margin of the provider servicing the connection to the destination device. For example, the destination gateway provider may store such information as the fixed cost for establishing a connection to the destination device as well as the normal margin for a call to the destination device. The margin multiplier calculator module determines a margin multiplier for a call by the user to the destination device. The individual rate calculator module uses the margin multiplier, the destination gateway provider information, and the user calling pattern information to determine a call rate to the destination for the user. In one embodiment, the call rate to the destination is determined by multiplying the margin multiplier with the normal margin for the call to the destination and adding the result to the fixed cost of the call to the destination.

The margin multiplier may be determined in a number of ways depending on the interest and business goals of the communication service provider. Additionally, a margin multiplier for selected desirable destinations and for other non-selected destinations may be calculated. In one embodiment, the margin multiplier is determined using a two-tier rate plan. In another embodiment, the margin multiplier is determined using a linear rate plan. A minimum margin multiplier may also be used to calculate the margin multiplier. In another embodiment, the margin multiplier is determined using an exponential ratio.

These and other features and advantages of the present invention may be better understood by considering the following detailed description of preferred embodiments of the invention. In the course of this description, reference will be frequently made to the attached drawings.

DETAILED DESCRIPTION OF THE PREFERRED EMBODIMENTS

Figure 1:
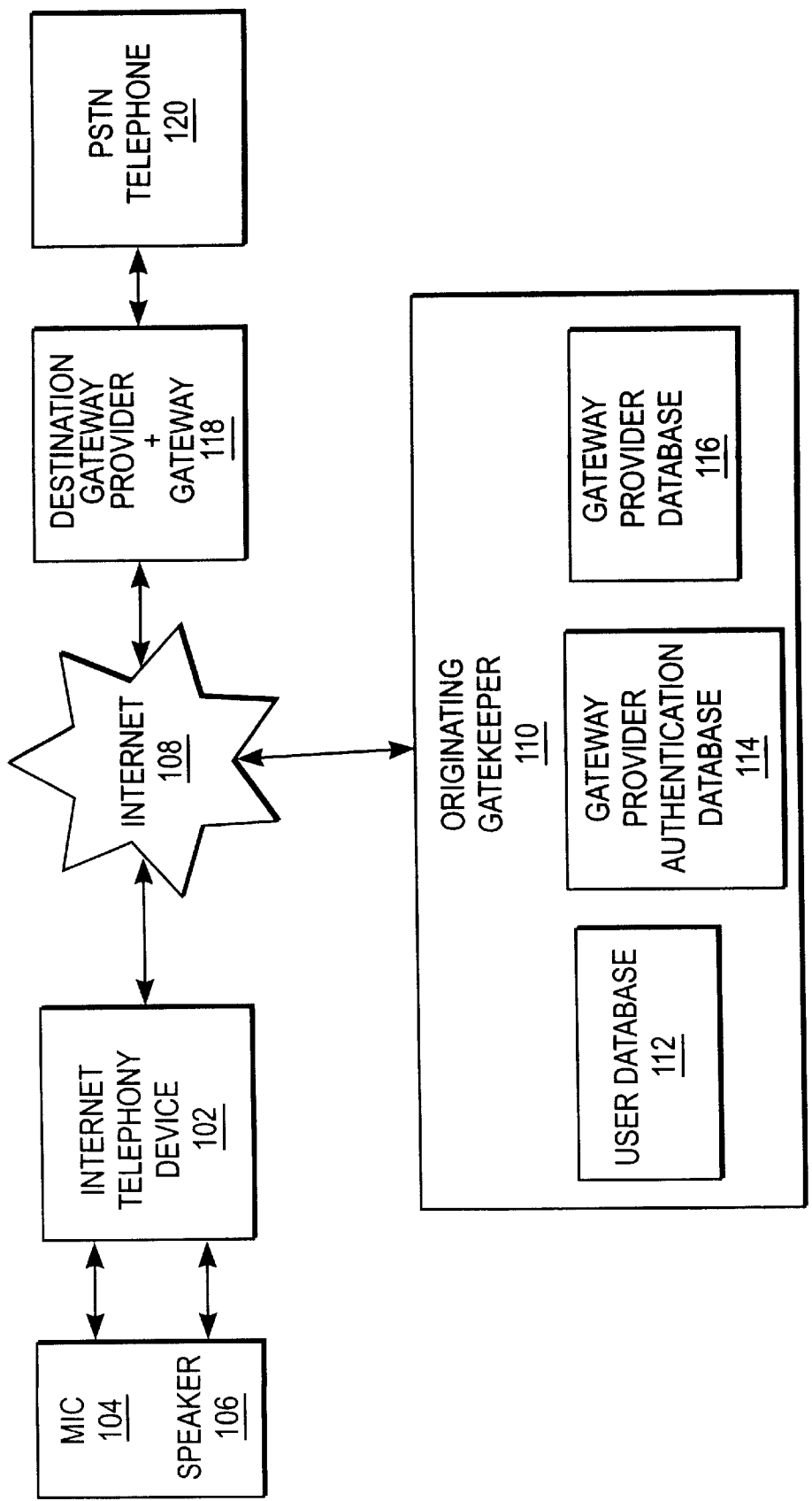
FIG. 1 is a block diagram of a communication system in accordance with the present invention.

Referring to FIG. 1, there is shown a block diagram of a communication system 100 embodying the principles of the present invention. The present invention preferably comprises an originating device 102 which is communicatively coupled to an originating gatekeeper 110, a destination gateway provider and gateway 118 and a destination device 120. The originating device 102 may be any type of communication device allowing a user to initiate and establish a communication via a network 108. Preferably, the originating device 102 is an internet telephone voice application such MediaRing Talk™ by MediaRing.com in Singapore which can be downloaded over the internet from www.mediaring.com. The internet telephone voice application may run on any computer system and allows communication between the internet telephony device 102 and another internet telephony device or a PSTN telephone. The internet telephony device 102 preferably includes a microphone 104 and speaker 106 for communicating. The internet 108 may be any computer network which allows communication between computer systems and networks.

The originating gatekeeper 110 may be any general purpose digital computer which serves as an internet gateway and preferably includes a user database 112 for keeping track of individual users registered with the originating gatekeeper 110, a gateway provider authentication database 114 for storing verification and authentication information for users and selected gateway providers, and a gateway provider database 116 for storing information on various destination gateway providers 118. Destination gateway provider and gateway 118 is an internet gateway for providing a communication link between the originating device 102 and the destination device 120. As with the originating device 102, the destination device 120 may be any type of communication device allowing a user to initiate communication via the network 108, and in the following description, is assumed to be a PSTN telephone. One skilled in the art will realize that the originating device 102 and the destination device 120 are not limited to the examples used in this detailed description but that they may include such devices as mobile telephones and other portable communication devices.

The gateway provider database 116 preferably keeps track of various gateway provider companies 118 that provide service to destination devices. Such information may include the rates of the gateway provider, any restrictions on time of day, the quality of service, and other general information that may be necessary or helpful in locating a gateway provider that satisfies any criteria specified by a particular user. The gateway provider database 116 may also by dynamically updated to contain only the most current information on the gateway providers 118. This may be accomplished by having the various gateway providers 118 provide the information directly to the originating gatekeeper 110 or by having the originating gatekeeper 110 query the various gateway providers 118 and using the responses to update the gateway provider database 116.

Thus, the present invention determines an individual phone rate for a user making a call from the originating device 102 to the destination device 120. The individual phone rate is one which is attractive to both the communication service provider that establishes the connection between the originating device and the destination device. In other words, the individual phone rate will be attractive to the user since the rates to desirable destinations will be less expensive for the user and the rates will be attractive to the service provider since the rates will still enable the service provider to earn a profit and attract new customers.

Figure 2:
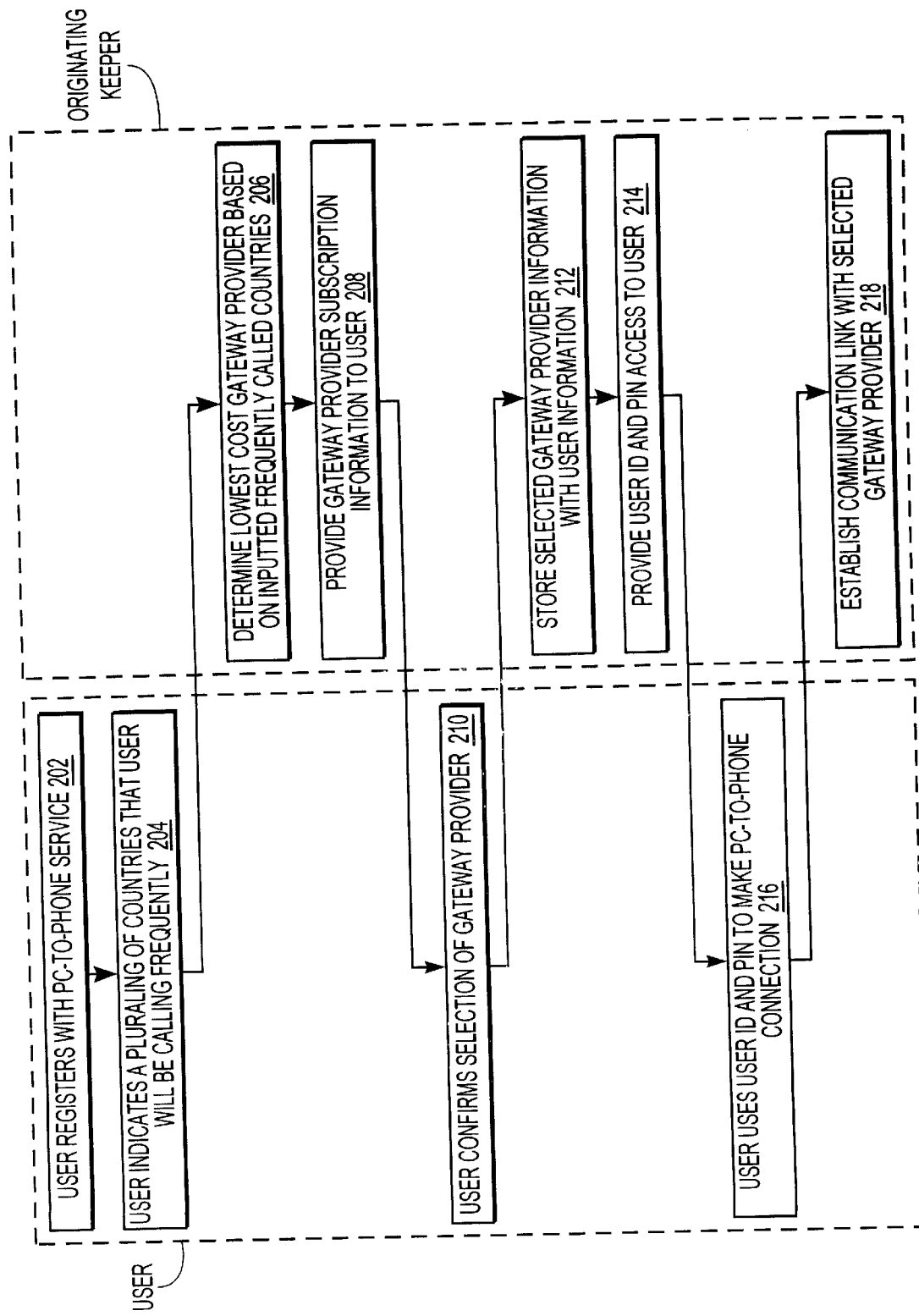
FIG. 2 is a flow chart of one embodiment of a method in accordance with the present invention.

Referring now to FIG. 2, there is shown a flow chart of one embodiment of a method in accordance with the present invention. In this embodiment, the communication is between an internet telephony device as the originating device and a standard telephone device as the destination device (i.e. a PC-to-phone communication). One skilled in the art will realize that the principles of the present invention described herein are not limited to PC-to-phone communications, but may be applied to communications between any originating device and any destination device including, but not limited to, PC-to-PC communications, and phone-to-phone communications.

In accordance with the present invention, a user accesses the originating gatekeeper 110 and the communication service using any commercial browser, such as Netscape Navigator™ by Netscape Communications in Mountain View, Calif., in conventional manner. The user may then register (202) with the originating gatekeeper 110 and subscribe to the communication service by inputting answers to questions listed on the web page sent by the originating gatekeeper 110. For example, the user may be required to enter his or her name, address, and telephone number. The user will also be required to indicate (204) a number of desirable or frequently called countries that he or she typically calls or intends to call frequently. For example, the user may indicate that the USA, UK, and China are the countries that the user most frequently calls. In another embodiment of the present invention, the user also may be required to indicate a call percentage for each desirable or frequently called country. The call percentage indicates the percentage of time the particular country will be called. For example, the user may enter a 50% call percentage for the USA, a 20% call percentage for the UK, and a 30% call percentage for China indicating that 50% of the time, calls are made to the USA, 20% of the time, calls are made to the UK, and 30% of the time, calls are made to China.

The originating gatekeeper 110 then uses the information received from the user to determine (206) an individual phone rate plan for the user. In other words, the originating gatekeeper 110 evaluates the entries in the gateway provider database 116 and retrieves the fixed costs and calling plan rates of the gateway provider that provides service to the most frequently called countries. The originating gatekeeper 110 determines a margin multiplier for the frequently called countries and uses the margin multiplier with the fixed costs of the provider to determine the most desirable individual phone rate plan for the user. In another embodiment, the present invention may calculate margin multipliers with fixed costs for several different gateway providers to determine the most attractive rate for the individual user. The gateway provider having the lowest average rate for the most frequently called countries indicated by the user will be selected by the originating gatekeeper 110. If the user also indicated the percentage of calls made to each country, matching weighting is assigned to the rate computation.

After the originating gatekeeper 110 has determined the individual rate plan for the user, the browser window may display (208) to the user web pages providing information on various rates for the frequently called countries. The user may then be required to accept (210) the individualized rate plan for the selected communication service. For example, the user may be required to input billing information such as a credit card number. Once the user has confirmed selection of the individualized communication rate plan, the user registration information and the individualized rate plan is stored (212) in user database 112 and/or gateway provider authentication database 114. The user may also be provided (214) with a user identification (user ID) and a password (PIN) for accessing and using the communication service via a personal computer. The user ID and PIN may be sent to the user via email or they may be incorporated into the user's PC software to automatically enable PC-based communication as would be known to those skilled in the art. The user then enters the user ID and PIN into the internet telephony device 102 to make a PC-based call.

One advantage of the present invention is the determination of an individualized calling plan based on information received from the user during the user's registration. By simply having the user enter the countries he or she most frequently calls, the present invention determines the most desirable calling rates for the frequently called countries. The present invention also allows calculation of different rates for different providers to determine the most attractive gateway provider.

Figure 3:
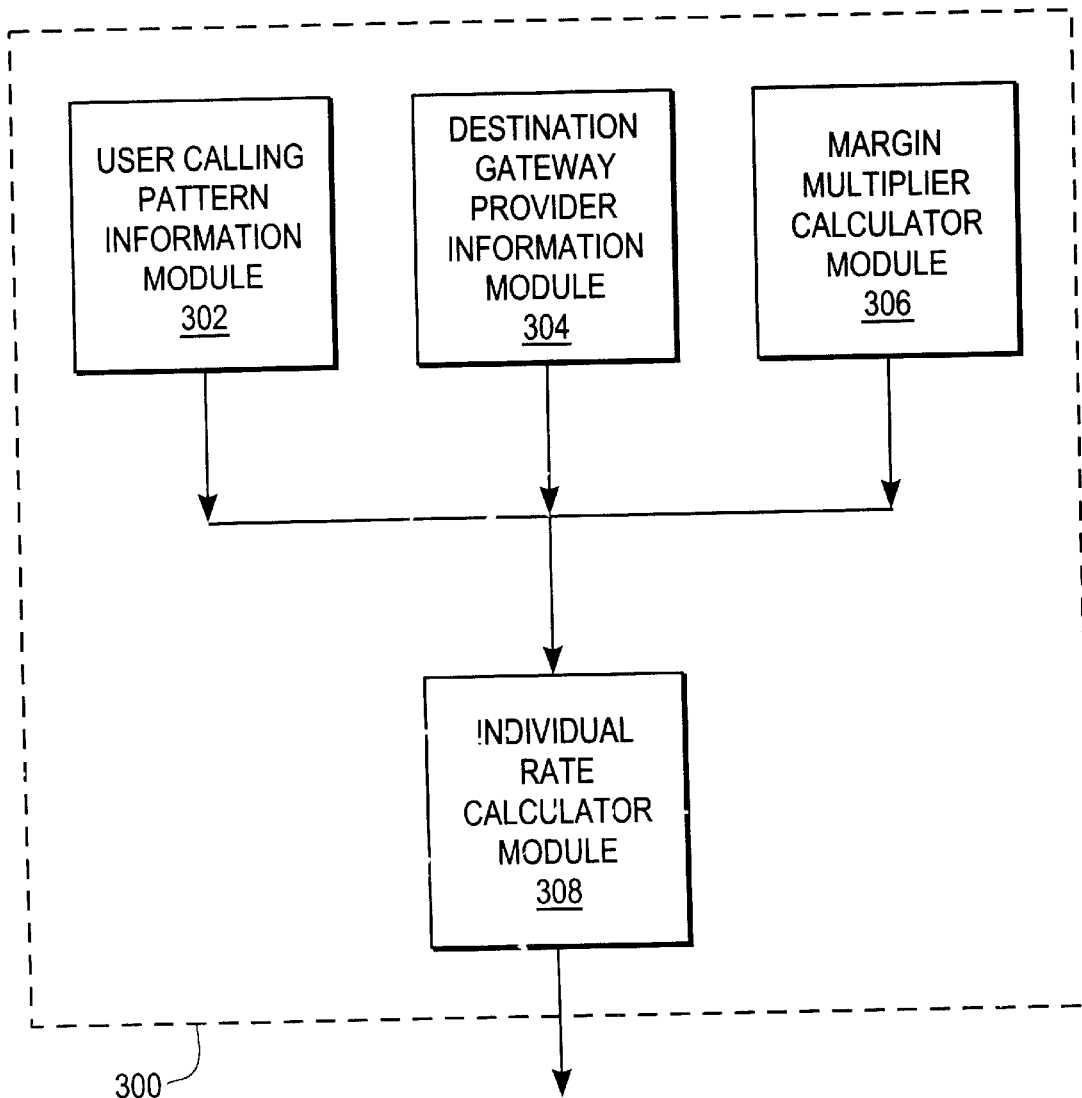
FIG. 3 is a block diagram of a system for determining an individual rate plan in accordance with the present invention.

Referring now to FIG. 3, there is shown a block diagram of a system 300 for determining an individual phone rate for a user. The system 300 for determining an individual phone rate is preferably located within the originating gatekeeper 110; however, one skilled in the art will realize that the system 300 is not limited to the originating gatekeeper 110, but may be located on another part of the system 100 or may comprise an independent stand alone system that is used in conjunction with the system 100. In accordance with the present invention, the rates for individual phone customers or users are scaled to discount destinations viewed as desirable by the customer. The destinations that are "desirable" are those destinations that the user may call most frequently. The desirable destinations for a particular user may be determined in several ways such as by evaluating the user's calling patterns by examining previous billing statements or with a new user, by asking the user to provide the cities or countries they call most frequently or are interested in calling. Different users may have or choose different desirable destinations, and some users may have only one desirable destination while other users may have many. The rates for individual phone users may also be based on call percentages. A call percentage is the percentage of time that a user calls or intends to call either a desirable destination or a non-desirable destination. The call percentages may be provided by the user or in the absence of user information, may be assigned a default value giving a higher percentage to destinations the user ranks as higher interest. For simplicity, the system and method for determining an individualized rate plan for a user will be described for one selected desirable destination. One skilled in the art will readily understand how the principles of the present invention described in terms of one selected desirable destination may be applied to several selected desirable destinations. Additionally, to simplify the detailed description of the invention, the present invention will be explained for a single rate for a given call to a given destination, independent of the length of the call. However, one skilled in the art will realize that the principles of the present invention apply equally to different time periods with different calling rates. Additionally, one skilled in the art will realize that the principles of the present invention may also apply for different times of the day, Holidays, weekends, etc... to maixmze profit or network usage.

Referring again to FIG. 3, system 300 comprises a user calling pattern information module 302, a destination gateway provider information module 304, a margin multiplier calculator module 306, and an individual rate calculator module 308. The user calling pattern information module 302 stores information relating to the calling patterns of an individual user. For example, the user calling pattern information module 302 may store information such as the desirable countries for a particular user, the call percentages for each desirable country, and the historical billing histories of a particular user. The calling pattern information may be inputted by the user in response to a questionnaire or a personal interview with the user, or it may be inputted by a system administrator. The destination gateway provider information module 304 may store information relating to the costs or calling plans for a specific destination gateway provider or multiple destination gateway providers. For example, the destination gateway provider information module 304 may store information such as the fixed cost for making a call to various destinations. The destination gateway provider information module 304 may also store information such as the cost for making a particular type of communication call such as a PC-to-phone communication, a phone-to-phone communication or a PC-to-PC communication. The destination gateway provider information module 304 may also store information such as the normal margin goal and the normal margin of the destination gateway provider. The normal margin goal is the profit margin that the destination gateway provider would like to make on the call, and the normal margin is the normal margin goal multiplied by the fixed cost for the call. For example, if a call has a fixed cost of 12 cents per minute, and a normal margin goal of 50%, then the normal margin would be 12 cents multiplied by 50% or 0.5 which is equal to 6 cents a minute. One skilled in the art will realize that the present invention is not limited to only one selected desirable destination or one gateway provider but that there may be information relating to various fixed costs and various destination gateway providers. Thus, there may be only one destination gateway provider information module 304 or multiple destination gateway provider information modules 304 for storing such information.

The margin multiplier calculator module 306 determines the margin multiplier used to determine the individualized phone rate. The margin multiplier is the multiplier which is used to reach a desired margin for a particular call that is either above or below the fixed cost. The margin multiplier is applied to the normal margin for the call. For example, the margin multiplier may be set to establish a phone rate to a destination that is either a positive non-zero margin, a zero margin, or a negative margin. For simplicity, the following examples will focus on the typical situation where it is desirable to charge more than the fixed cost for the call and therefore have a positive, non-zero margin. One skilled in the art would be able to easily take the principles of the present invention and use them to determine either a zero or negative margin.

The individual rate calculator module 308 determines the individual phone rate for the user. In one embodiment, the individual phone rate is determined by first multiplying the normal margin by the margin multiplier and adding the result to the fixed cost for the call. For example, if a call has a fixed cost of 12 cents per minute, and a normal margin goal of 50%, then the normal margin would be 6 cents per minute, and the normal phone call rate would be 18 cents per minute (12 cents+6 cents). If this same call were to a selected desirable destination with a discounted rate and a margin multiplier of 0.5, then the new margin for the call would be the normal margin multiplied by the margin multiplier (6 cents*0.5=3 cents) or 3 cents per minute, and the new individualized phone call rate for the user would be the fixed cost plus the new margin (12 cents+3 cents=15) or 15 cents per minute. Similarly, if the margin multiplier for the selected desirable destination were 1.5, then the new margin would for the call would be 9 cents per minute (6 cents*1.5=9 cents), and the new individualized phone call rate for the user would be 21 cents per minute.

Thus the present invention advantageously allows a phone service to establish individualized phone rates for a particular user based on the users calling patterns, such as the destinations most frequently called by the user, and on a margin multiplier for the selected desirable destination. In a preferred embodiment, the present invention is used to balance the total margin for a user's individualized phone rate by increasing some call rates to offset discounts on others. In other words, a weighted average of the margin multipliers is determined so that the average of the multipliers for all destinations is 1.0. In a preferred embodiment, the fraction used for the weighted average is the minutes of calls. One skilled in the art will realize that the present invention is not limited to the systems and methods described herein but that other methods could be used to average the margins such as weighted averages using actual billing dollars, number of calls, etc... depending on the accounting needs and management goals of the communication service provider.

Figure 4:
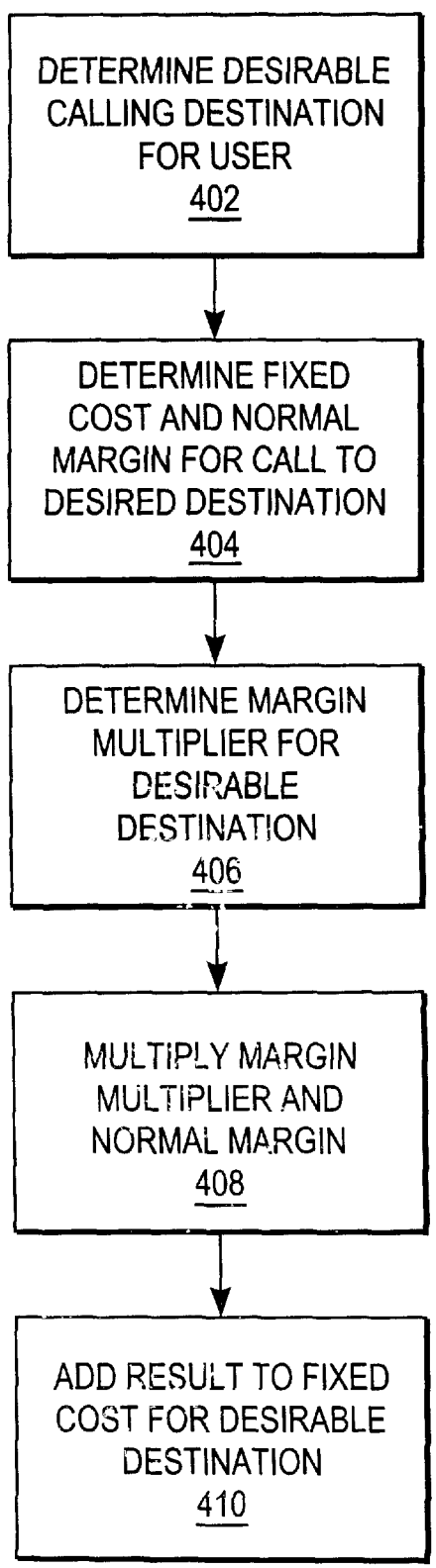
FIG. 4 is a flow chart of one embodiment of a method for determining an individualized phone rate for a desirable destination.

Referring now to FIG. 4, there is shown a flow chart of one embodiment of a method for determining a phone rate for a call to a desirable destination using a margin multiplier. For simplicity, the flow chart describes a method for determining the phone rate for a single desirable destination. One skilled in the art will realize that the principles described herein may be easily applied to determine the phone rate for more than one desirable destination. First, a desirable calling destination is determined 402 for a user. As discussed above, a desirable calling destination may be determined by requesting an input from the user or by examining the user's previous billing statements. Next, the fixed cost and normal margin for a call to the desirable calling destination is determined 404. The fixed cost and normal margin may be determined for a single destination gateway provider or for multiple destination gateway providers. For simplicity, the remaining description will focus on a single gateway provider; however, one skilled in the art will realize that the principles described herein may be applied to the fixed cost and normal margins for more than one destination gateway provider. Such information can then be used to compare and contrast the costs for various destination gateway providers. Next, the margin multiplier for the selected desirable destination is determined 406. The margin multiplier is multiplied 408 with the normal margin, and the result is added 410 to the fixed cost. The result is the phone rate for the selected desirable destination using a margin multiplier.

Figure 5:
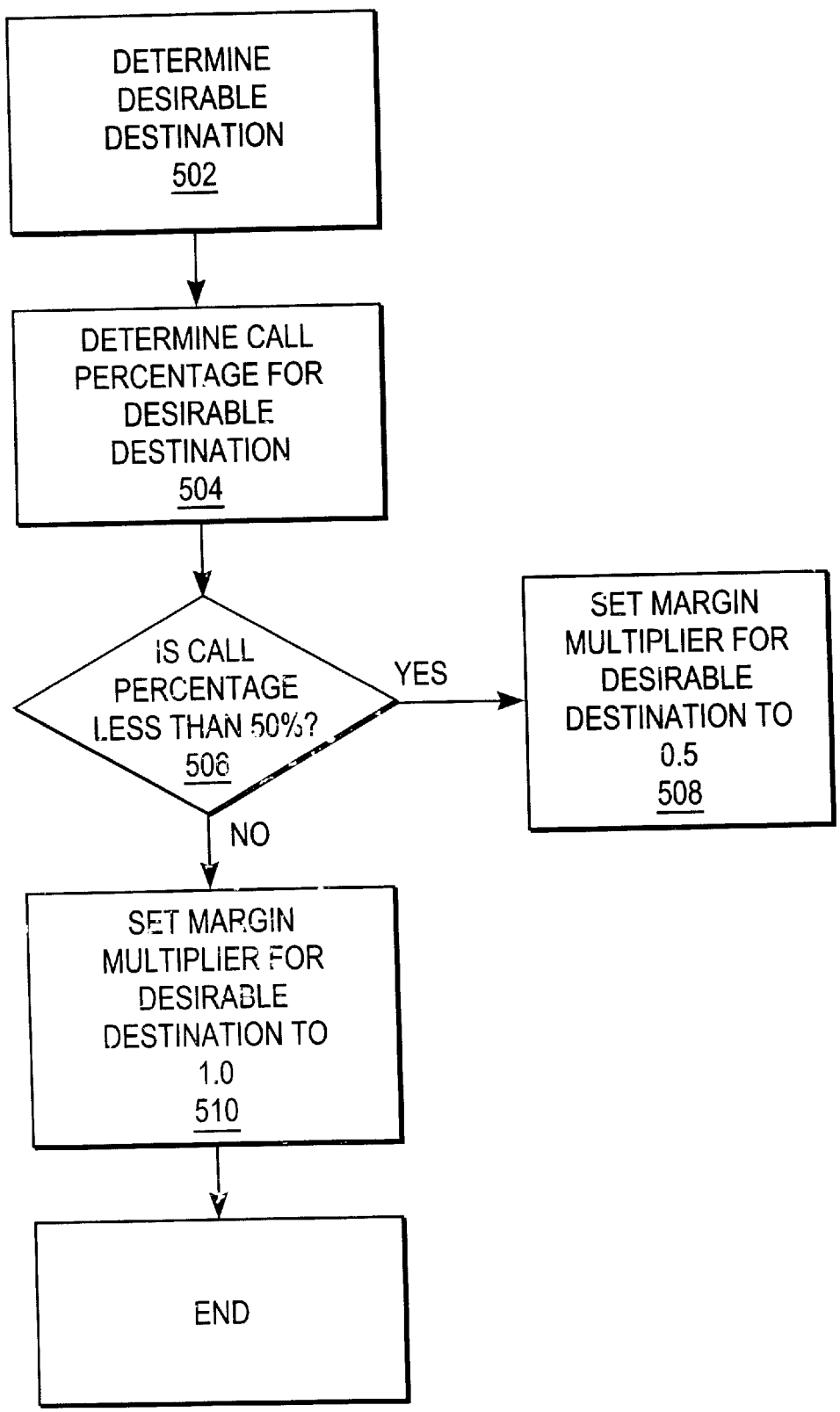
FIG. 5 is a flow chart of one embodiment of a method for determining a margin multiplier for a desirable destination.

Referring now to FIG. 5, there is shown a flow chart of one embodiment of a method for determining the margin multiplier ($M_S$) for a selected desirable destination. The margin multiplier in the method of FIG. 2 is determined using a two-tier rate plan. First, the desirable destination for a user is determined 502. As discussed above, the desirable destination may be a city, country, phone number, etc . . . and is typically a destination that is frequently called by the user or that the user desires to call frequently. Next, a call percentage ($F_S$) is determined 504 for the desirable calling destination. As discussed above, the call percentage is typically the percentage of time the user will be calling the desirable destination. Although the call percentage for a desirable destination is specifically determined in FIG. 5, one skilled in the art will realize that the call percentage for all other destinations that are not desirable destinations may be determined by subtracting from 100 the sum of the call percentages for the selected desirable destinations. For simplicity, the call percentages used in this detailed description will be assumed to be a number between 0.0 and 1.0 where 0.0 indicates that the user never calls the selected destination and 1.0 indicates that the user only calls the selected destination or has no intention to call any other destination. Typically, if the call percentage to a particular desirable destination is 1.0, that is, the user is making all the calls to the selected desirable destination, then the margin multiplier for the selected desirable destination is 1.0 and no discount is possible if the communication service provider is to adhere to the goal of maintaining the average normal margin. If the call percentage to a particular desirable destination is 0.0, then the margin multiplier for the selected desirable destination is 0.0.

Figure 6:
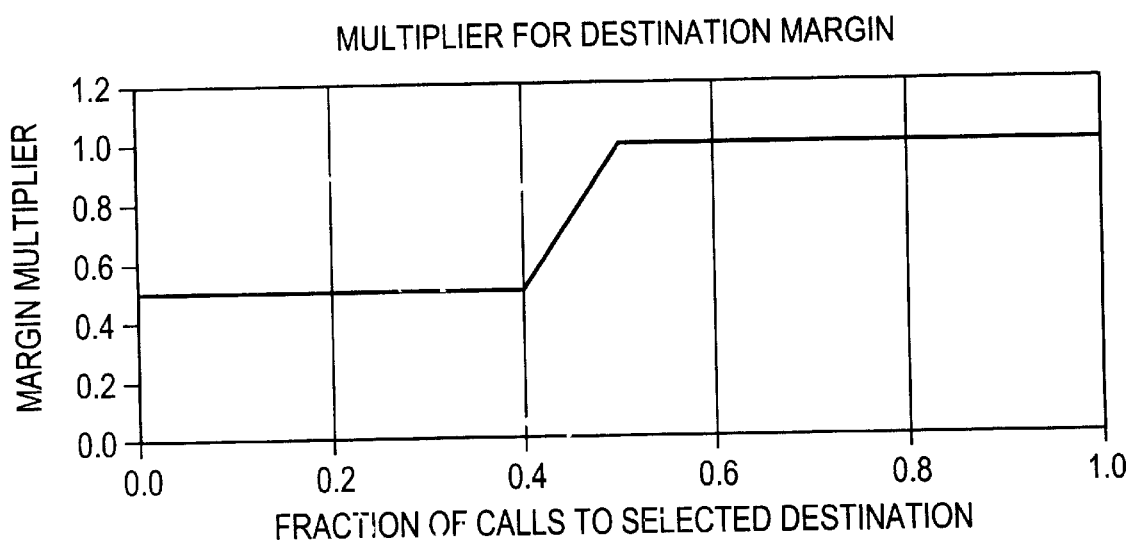
FIG. 6 is a graph illustrating a two-tier rate plan for determining the margin multiplier.

The present invention then determines 506 if the call percentage for the desirable destination is less than 50%. If the call percentage for the desirable destination is less than 50%, then the margin multiplier for the selected destination is set 508 to 0.5. If the call percentage for the desirable destination is 50% or greater, then the margin multiplier for the desirable destination is set 510 to 1.0. FIG. 6 illustrates one embodiment of such a two-tier rate plan for determining the margin multiplier. Equations 1A and 1B below illustrate mathematically the determination of the margin multiplier in accordance with the two-tier rate plan.

$$\text{If: } F_S >= 0.5, \text{ then } M_S = 1.0 \tag{1A}$$

$$\text{Else } M_S = 0.5$$

where $M_S$=Margin Multiplier for desirable destination $F_S$=Call percentage for desirable destination One skilled in the art will realize that the present invention is not limited to margin multiplier values of 0.5 and 1.0, but that any two numbers whose sum is equal to one may be used to set the margin multipliers in a two-tier rate plan.

Figure 7:
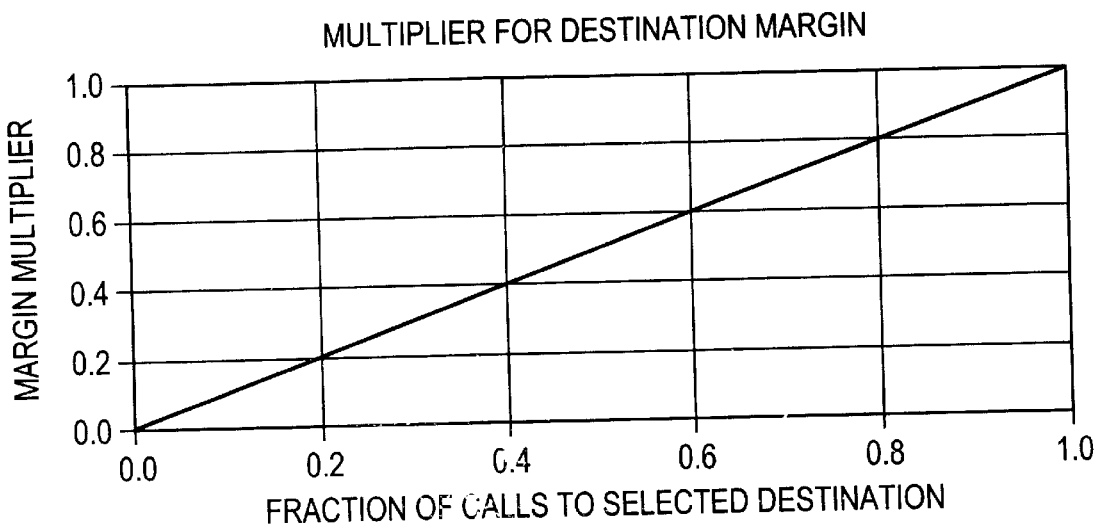
FIG. 7 is a graph illustrating the use of a continuous scale for determining the margin multiplier.

Referring now to FIG. 7, in another embodiment of the present invention, the margin multiplier for a selected desirable destination may be determined using a continuous scale. As discussed above with reference to FIG. 5, if the call percentage to a particular desirable destination is 1.0, that is, the user is making all the calls to the selected desirable destination, then the margin multiplier for the selected desirable destination is 1.0 and no discount is possible if the communication service provider is to adhere to the goal of maintaining the average normal margin. If the call percentage to a particular desirable destination is 0.0, then the margin multiplier for the selected desirable destination is 0.0. For all other values of the call percentage between 0.0 and 1.0, the following continuous scale method is used to determine the margin multiplier for the desirable destination.

The continuous scale method uses a target average multiplier ($M_{TARG}$) to determine the margin multiplier ($M_S$). The target average multiplier is the target average margin of all margin multipliers for all destinations. In a preferred embodiment, the target average multiplier is 1.0. The use of target average multipliers that are other than 1.0 will be discussed below in more detail. The margin multiplier for a selected desirable destination may be determined using Equation 2.

$$M_S = M_{TARG} * F_S \tag{2}$$

where $F_S$ is the call percentage to the selected desirable destination.

Figure 8:
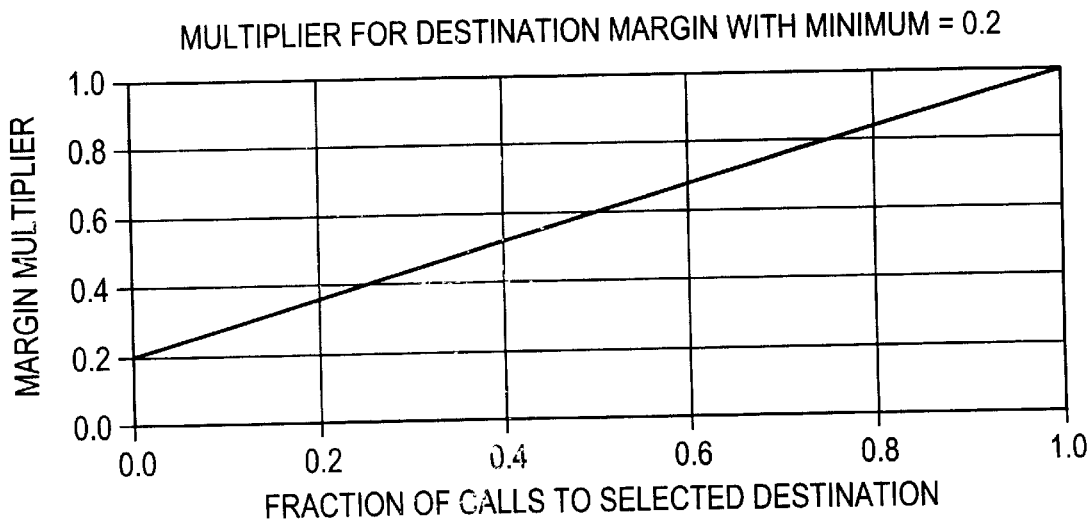
FIG. 8 is a graph illustrating the use of a continuous scale and a minimum margin multiplier for determining the margin multiplier.

Referring now to FIG. 8, in another embodiment of the present invention, the margin multiplier is determined using a continuous scale and a minimum margin multiplier ($M_{MIN}$). The minimum margin multiplier is the minimum multiplier for the selected desirable destination. The minimum margin multiplier is used to ensure that the margin multiplier is never zero. Using a minimum margin multiplier, the margin multiplier for a selected desirable destination is determined using Equation 3.

$$M_S = M_{MIN} + (M_{TARG} - M_{MIN}) * F_S \quad (3)$$

As shown in FIG. 8, the lowest minimum margin multiplier is 0.2 and the term in parenthesis in equation 3 sets the range of the curve, which is 0.8 in this example.

Figure 9:
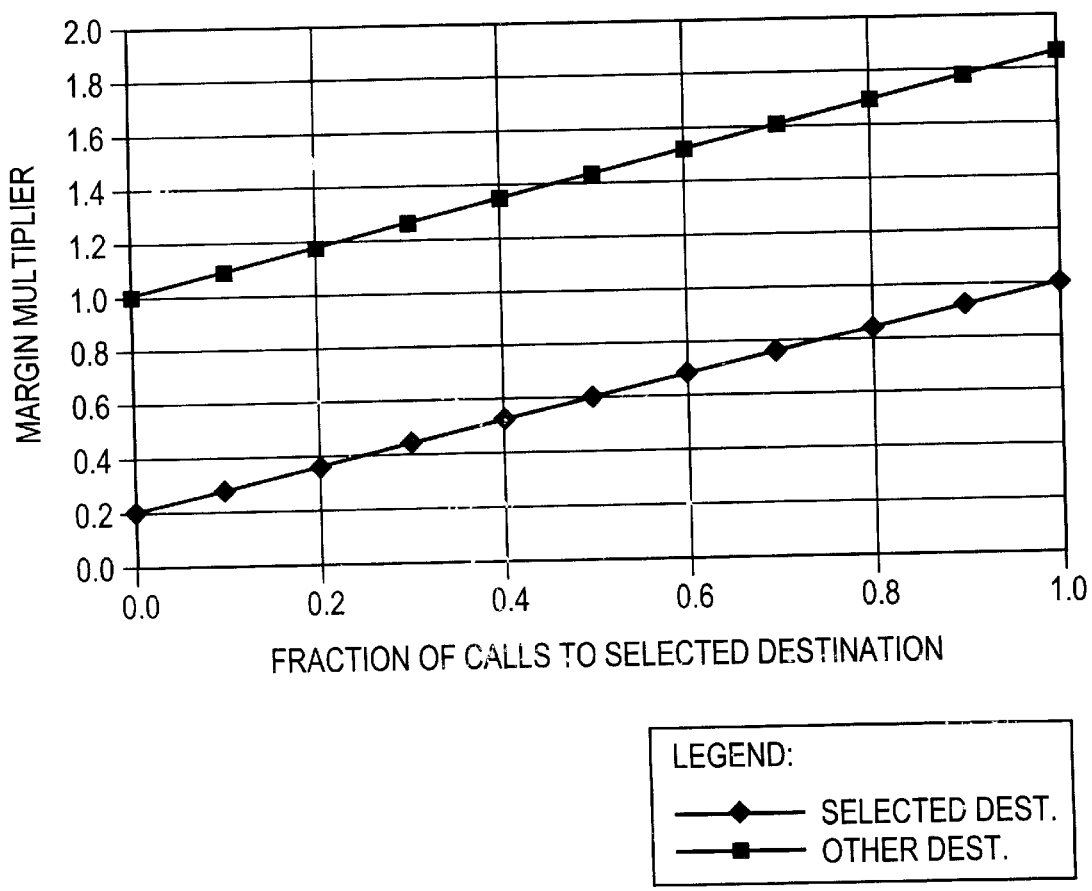
FIG. 9 is a graph illustrating the relationship between the margin multiplier for selected desirable destinations and the margin multiplier for other destinations.

The present invention may also be used to determine the margin multiplier for "other" destinations. As used herein, "other" destinations refers to the group of all another calling destinations that were not selected as a desirable calling destination. Referring now to FIG. 9, there are shown two curves: the lower curve corresponds to the margin multiplier for selected destinations as shown in FIG. 8, and the upper curve shows the margin multiplier for the other destinations. The relationship between the two curves is illustrated in Equations 4A and 4B. The margin multiplier for other destinations ($M_O$) may be derived from the goal that the weighted average of the margin multipliers for all the desirable destinations and the margin multiplier for other destinations should equal the target average multiplier ($M_{TARG}$). In other words, $M_{TARG}$ should equal $((M_S+F_S)+(M_O+F_O))$. Equations 4A and 4B below illustrate how margin multiplier for selected desirable destinations and for other destinations are calculated.

$$M_S = M_{MIN} + (M_{TARG} - M_{MIN}) * F_S \quad (4A)$$

$$M_O = ((M_{TARG} - (M_S * F_S))/F_O \quad (4B)$$

where $F_O$ is the call percentage for other destinations.

Thus, the margin multiplier for other destinations will typically form a curve that parallels the margin multiplier for selected desirable destinations. In a preferred embodiment, $F_O$ cannot be allowed to go to zero. Therefore, it is preferable to add a small amount (e.g. 0.00001) to the $F_O$ or to constrain $F_O$ to be at least a small amount, e.g. 5%. Preferably, it is more practical to limit the value of $F_O$ to a non-zero number.

In another embodiment of the present invention, equations 5A and 5B are used to determine the margin multipliers for selected desirable destinations and other destinations.

$$M_S = M_{MIN} + (M_{TARG} - M_{MIN}) * (e^{(C \cdot FS)} - 1)/(e^C - 1) \quad (5A)$$

$$M_O = ((M_{TARG} - (M_S * F_S))/F_O \quad (5B)$$

where e is the irrational base of the natural logarithm (approx. 2.718281828) and C is the curve constant. Curve constants with values near zero (e.g. 0.01) produce a linear or near-linear curve. Positive values (e.g. 3) produce curves with an increasing positive slope from left to right. Negative values (e.g. −3) produce curves with a decreasing positive slope from left to right.

Figure 10:
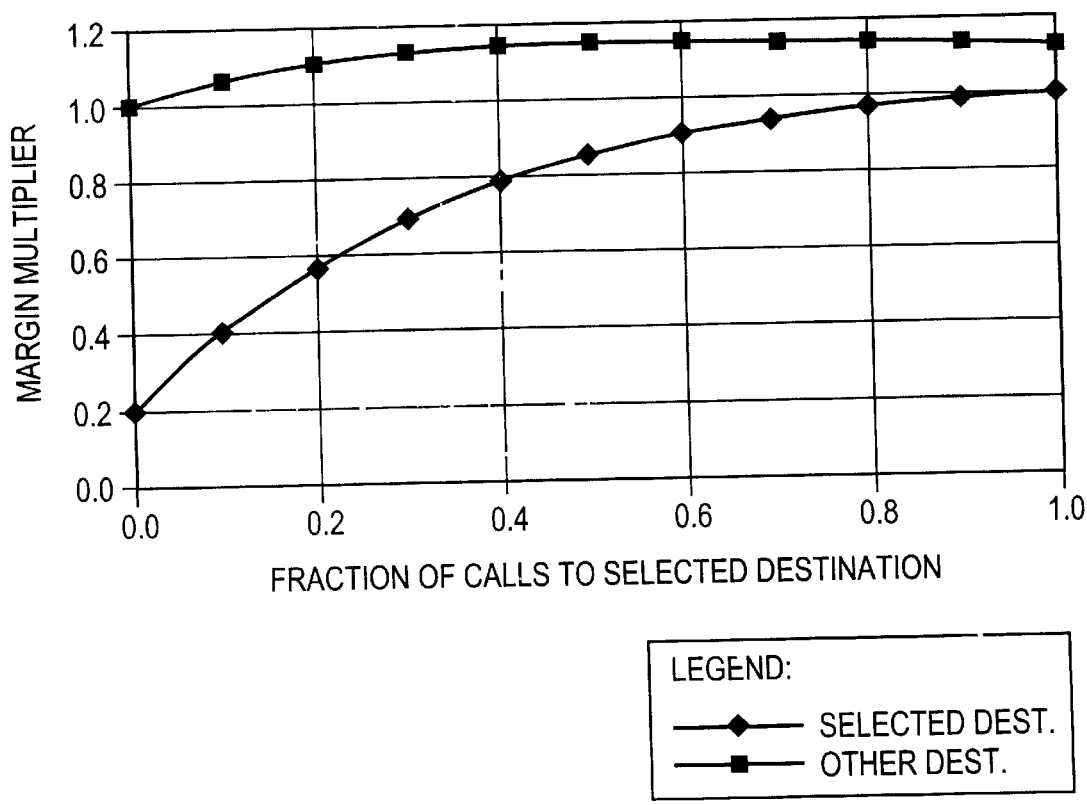
FIG. 10 is a graph illustrating the use of an exponential ratio for determining the margin multiplier where the curve constant is equal to −3.
Figure 11:
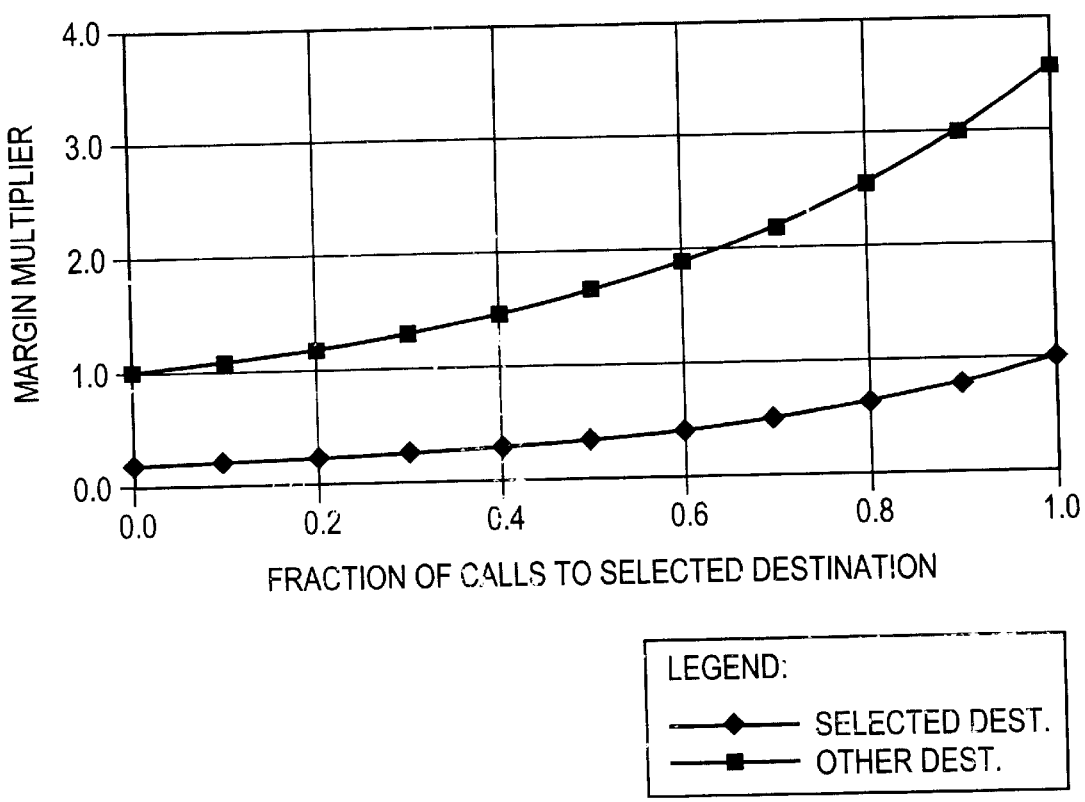
FIG. 11 is a graph illustrating the use of an exponential ratio for determining the margin multiplier where the curve constant is equal to 3.
Figure 12:
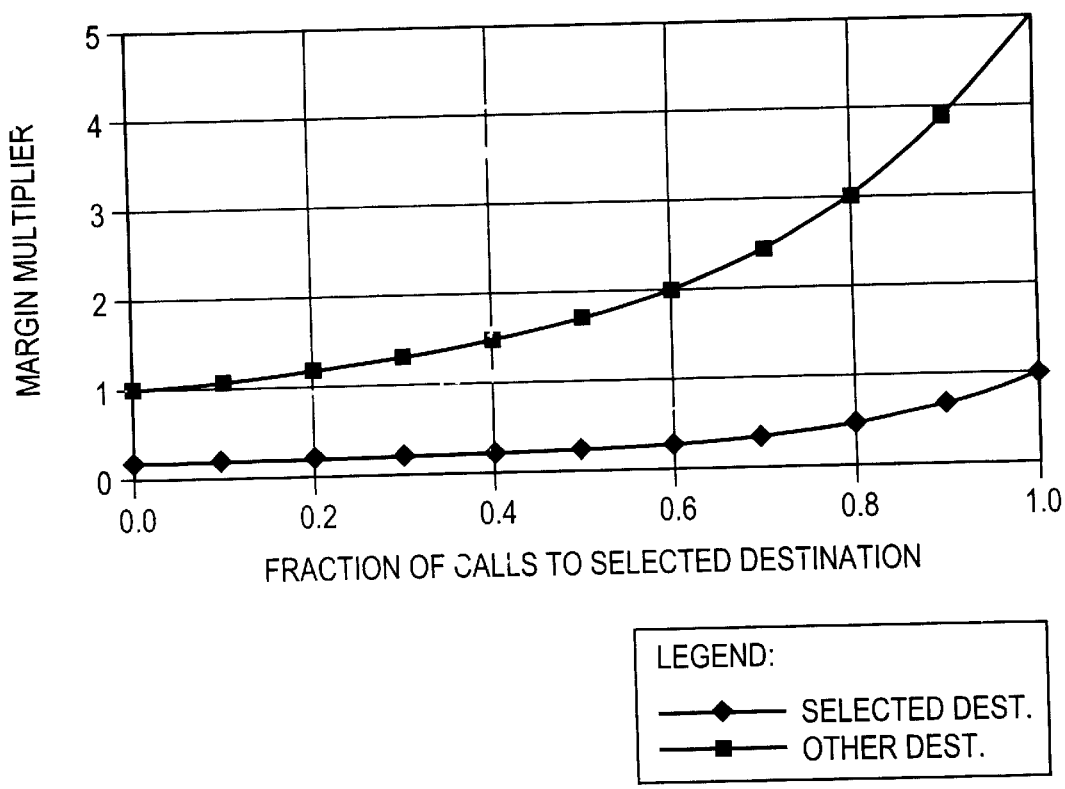
FIG. 12 is a graph illustrating the use of an exponential ratio for determining the margin multiplier where the curve constant is equal to 5.

In this embodiment, the call percentage, $F_S$, is replaced with the exponential ratio: $(e^{(C \cdot FS)} - 1)/(e^C - 1)$. This exponential ratio meets the limit criteria of equaling the target average multiplier, $M_{TARG}$, when $F_S$ is equal to 1.0 and equals the minimum margin multiplier, $M_{MIN}$, when $F_S$ is equal to 0.0. By varying the curve constant, C, curves of different shapes can be generated. For example, the curves in FIG. 9 were computed using Equations 5A and 5B using a C value of 0.01. A value near zero will result in a linear or near linear relationship. In a preferred embodiment, C is never set to 0.0 since this will cause a zero divide error in equation 5A. If the curve constant is negative, the margin multiplier for the selected desirable destination, $M_S$, will be convex as shown in FIG. 10 where C=−3. This has the effect of having $M_S$ quickly move toward 1.0 as the call percentage increases. Since $M_S$ does not stray far from 1.0 for significant call percentages, the compensation by $M_O$ is less severe and it too stays close to 1.0 as shown in the upper curve of FIG. 10. If the curve constant, C, is positive, $M_S$ will be a concave curve as shown in FIG. 11 where C=3. This has the effect of delaying the advance of $M_S$ toward 1.0 as the call percentage increases. Since $M_S$ remains low for significant call percentages, the compensation by $M_O$ is more dramatic as it must be increased to keep the target average multiplier value 1.0. At the extreme, it rises to over 3 meaning the margin multiplier for other destinations will be 3 times the nominal value in the situation where the desirable destination is used 90% of the time. This is probably acceptable from a business perspective. Referring now to FIG. 12, there is shown an even more severe curve with C=5. Here, the margin multiplier for other destinations rises to 5. This may prove alarming to customers when they see a bill with calls to these destinations. To avoid this, a limit may be placed on the margin multiplier for other destinations.

Figure 13:
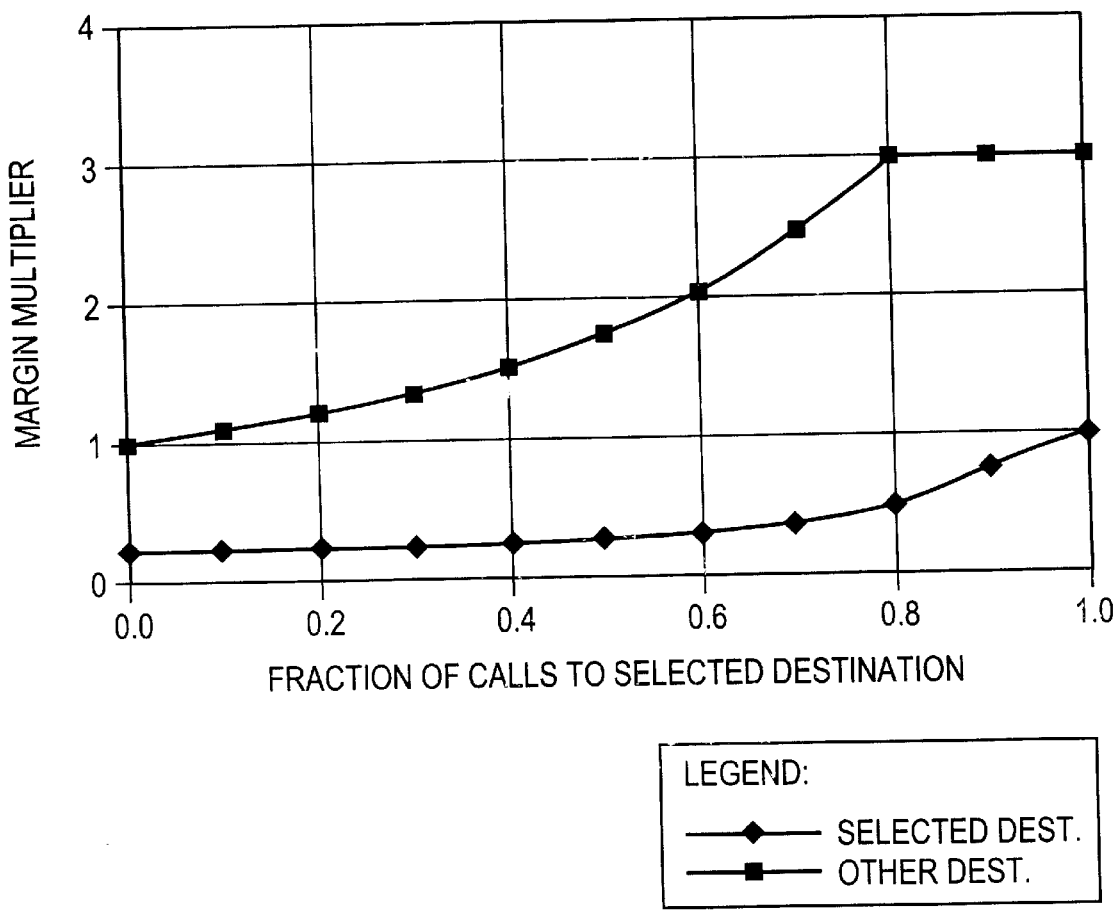
FIG. 13 is a graph illustrating the effect of placing a limit on the margin multiplier.

In yet another embodiment of the present invention, a limit can be placed on the margin multiplier for other destinations. Equations 6A and 6B demonstrate how to implement such a limit.

$$M_S = M_{MIN} + (M_{TARG} - M_{MIN}) * (e^{(C \cdot FS)} - 1)/(e^C - 1) \quad (6A)$$

$$M_O = MIN[M_{MAX}, ((M_{TARG} - (M_S * F_S))/F_O] \quad (6B)$$

where $M_{MAX}$ is the maximum multiplier for other destinations. Referring now to FIG. 13, the effect of a limit on the margin multiplier for other destinations is shown in the upper curve. Here, the margin reaches 3 at a fraction of 0.8 and stays at that limit for all higher values.

The limit used in equations 6A and 6B may result in a reduced margin multiplier for other destinations, $M_O$, which will lower the target average multiplier, $M_{TARG}$, below the target (in these examples, 1.0). To compensate for this, the margin multiplier for desirable destinations, $M_S$, can be increased. This can be accomplished using equations 7A, 7B, and 7C.

$$M_{TEMP} = M_{MIN} + (M_{TARG} - M_{MIN}) * (e^{(C \cdot FS)} - 1)/(e^C - 1) \quad (7A)$$

$$M_O = MIN[M_{MAX}, ((M_{TARG} - (M_{TEMP} * F_S))/F_O] \quad (7B)$$

$$M_S = (M_{TARG} - (M_O * F_O))/F_S \quad (7C)$$

where $M_{TEMP}$ is the temporary margin multiplier for the desirable destination.

The above equations are a one step iteration where a temporary $M_S$ value, $M_{TEMP}$, is computed in equation 7A and used as the basis for computation of $M_O$ in 7B. To ensure that the target is met, $M_S$ is recomputed in 7C using $M_O$ as the basis to satisfy the goal of averaging to the target average multiplier, $M_{TARG}$. If there were no limit activity in 7B, then step 7C should result in the same result as 7A (allowing for any round-off errors). However, if step 7B resulted in a value for $M_O$ that was limited by the "MAX" function, then step 7C will compensate. The lower curve of FIG. 13 was computed using equation set 7.

The present invention will now be illustrated with reference to an example. In the first example, a user has selected one desirable destination and a call percentage of 40% for that destination. In this example, the values of the parameters are as follows:

$F_S = 0.4$ $M_{TARG} = 1.0$ $M_{MIN} = 0.2$ $M_{MAX} = 3.0$ $C = 3$

Applying equation 7A, $M_S$ is calculated to be 0.30 and from Formula 7B, $M_O$ is calculated to be 1.47. Applying these values to the normal phone rates means that the margin multiplier for selected desirable destination will be multiplied by 0.3 and added to the cost of the calls to the selected desirable destination to determine the phone rate for calls to the selected desirable destination. The margin multiplier for other destinations will be multiplied by 1.47 and added to the cost of the calls to the other destinations to determine the phone rate for calls to other destinations. Thus, the present invention advantageously allows the phone rates for the selected desirable destinations to appear attractive to the user who will hopefully make a favored decision to use a communication system implementing dynamic individual phone rates.

For multiple selected desirable destinations, the same procedure as described in the above example is applied. For example, consider the following selected desirable destinations and call percentages shown in Table 1:

TABLE 1

| Destination 1 | 20% |
| Destination 2 | 10% |
| Destination 3 | 10% |
| Destination 4 | 5% |
| Other Destinations | 55% |

The other constants are set as follows:

$M_{TARG} = 1.0$ $M_{MIN} = 0.2$ $M_{MAX} = 3.0$ $C = 3$

The sum of Destinations 1, 2, 3, and 4 are treated as a single destination group and the margin multiplier for this group of destinations is calculated. The margin multiplier for the other destinations group is also calculated. Thus, the call percentage for the destination group, $F_S = 0.45$ and the call percentage for the other destinations, $F_O = 0.55$. Solving equations 7A and 7B yield $M_S = 0.32$ and $M_O = 1.56$. The value of $M_O = 1.56$ is retained as the margin multiplier for the other destinations and is used for determine the phone rate for calls to other destinations. The value of $M_S = 0.32$ becomes an intermediary value to be used in further calculations to price out the individual selected desirable destinations, i.e. Destinations 1, 2, 3, and 4.

The next step repeats the process above by taking the lowest percentage selected desirable destination and considering it as the "other destination" and using the remaining desirable destinations summed as a single desirable destination. The previously computer margin multiplier for the selected desirable destination group (0.32) will be the new target average multiplier, $M_{TARG}$. In the previous step, the margin multiplier for the composite group of destinations was 1 to 4, was calculated as 0.32. Preferably, when this group is split into subgroups with individual margin multipliers, it is important not to invalidate the previous calculation of the margin multiplier for other destinations (in this example, 1.56). Because the equations maintain the weighted average of selected desirable and other destinations multipliers equal to the target average multiplier, further splitting of the group will not invalidate the previous estimation of the margin multiplier for other destinations. This feature of the present invention advantageously enables the successive calculation steps.

In this example, since Destination 4 has the smallest call percentage of 5%, it becomes the "other destination" for the next calculation. The other 3 larger selected desirable destinations, Destinations 1, 2, and 3, sum to 40% and will be treated as a single selected desirable destination. Together, the two composite destinations add to a total of 45%.

In one embodiment, the equations may be scaled to the 45% total of the remaining call percentages. In another embodiment, the call percentages may be scaled to the 0 to 1 range for the equations. Applying the latter embodiment, $F_O = 5/45 = 0.11$ for the other destinations and $F_S = 40/45 = 0.89$ for the selected destinations. Applying equations 7A and 7B results in $M_S = 0.28$ and $M_O = 0.61$. $M_O$ is retained as the margin multiplier for Destination 4. $M_S$ becomes the new $M_{TARG}$ of the three remaining desirable destinations. Thus, so far, the results are as shown in Table 2:

TABLE 2

| Destination | Call Percentage | Margin Multiplier |
| --- | --- | --- |
| 1 & 2 & 3 | 40% | 0.28 |
| 4 | 5% | 0.61 |
| Other | 55% | 1.56 |

The group of three destinations is split in the same way as was done for Destination 4 by taking the destination with the lowest call percentage and splitting it off as the "other destination". However, since there are two destinations with the same call percentage, each of which could be considered as having the lowest call percentage, these two destinations are treated as a single group and a shared and equal margin multiplier is determine for the group. In other words, anytime there are more than one destinations with the same call percentage value, those destinations are treated as a single destination group and a single shared margin multiplier is determined for the group. Thus, Destination 2 and 3 are grouped as a single destination with a call percentage of 20%. This group is split off as the "other destination" group. This leaves Destination 1 as the sole selected desirable destination with a call percentage of 20%. Applying the scaling method described above, $F_O = 0.5$ for the other destinations and $F_S = 0.5$ for the selected destination. The previous step's $M_S$ is used to set the new $M_{TARG}$ to 0.28. Equations 7A and 7B are then solved resulting in a $M_O = 0.35$ and a $M_S = 0.21$. Applying these factors to the constituents of these groups means that both Destination 2 and Destination 3 have margin multipliers of 0.35 and Destination 1 has a margin multiplier of 0.21. Since the selected destination group only has one member, Destination 1, there is no further calculations to perform. Thus the above example are summarized as follows in Table 3:

TABLE 3

| Destination | Call Percentage | Margin Multiplier |
| --- | --- | --- |
| 1 | 20% | 0.21 |
| 2 | 10% | 0.35 |
| 3 | 10% | 0.35 |

TABLE 3-continued

| Destination | Call Percentage | Margin Multiplier |
|---|---|---|
| 4 | 5% | 0.61 |
| Other | 55% | 1.56 |

Thus most commonly called destination, Destination 1, has the lowest margin multiplier (0.21), and in order, each less commonly called destination has a progressively larger margin multiplier with the highest margin multiplier being attributed to the "other" destination. Moreover, destinations with equal call percentages, e.g. Destinations 2 and 3, have equal margin multipliers.

These results can be verified by calculating the weighted averages of the results. Scaling the margin multiplier for each destination by its call percentage and adding, the result should be equal to the original target average multiplier, $M_{TARG}$, or 1.0 as demonstrated below.

$$(F_{S1}*M_{S1})+(F_{S2}*M_{S2})+(F_{S3}*M_{S3})+(F_{S4}*M_{S4})+(F_O*M_O)=M_{TARG} \quad (8)$$

$$(0.2*0.21)+(0.1*0.35)+(0.1*0.35)+(0.05*0.61)+(0.55*1.56)=1.0005$$

Although the previous example handled four selected desirable destinations, one skilled in the art will relaize that the principles of the present invention may be applied to any number of desirable destinations by repeatedly separating the destination with the smallest call percentage and calculating the margin multiplier for this destination as if it were the "other" destination. Thus, the present invention advantageously allows the communication service provider to make any choice as to the number of selected desirable destinations the user may input without any change in the method of the present invention. One skilled in the art will also appreciate that although the previous example used call percentages supplied by the user, another embodiment of the system would be able to accumulate historical data and generate a complete estimate of call percentages to selected destinations for an established user. Thus, the present invention advantageously allows the communication service provider to dynamically generate an individualized rate plan to present to the user when it is time to renew the service subscription.

In another embodiment, if the user does not provide call percentages for the selected desirable destinations, default call percentages may be used. One skilled in the art will realize that there are many algorithms that may be used to assign default call percentages to the different desirable destinations. For example, in one embodiment, it may be assumed that the highest call percentage is attributed to the destination first listed and that the more destinations that are listed, the closer the user will come to describing 100% of the calls. It may also be assumed that there is always a percentage not described by the list. In other words, there is always an "other" category. Thus, in one embodiment, if there is only one selected desirable destination, the default call percentage for this destination will be 0.5 and the call percentage for the other destinations will be 0.5. If there are two selected destinations, the default call percentage for the first destination will be 0.5, the default call percentage for the second destination will be 0.25, and the default call percentage for the other destination will be 0.25. In there is a third selected destination, the third selected destination will have a default call percentage equal to one half of the default call percentage of the second destination (i.e. 0.125) and the other destination will have a default call percentage of 0.125. Thus, one skilled in the art will realize that each Nth selected desirable destination will have a default call percentage equal to one half of the default call percentage of the N−1 selected desirable destination.

Although the present invention has been applied to the pricing of phone rates, one skilled in the art will realize that the principles of the present invention may be applied to any number of fields where users have to choose between similar suppliers based on price and where individuality in the utilization of various aspects of the service is important.

From the above description, it will be apparent that the invention disclosed herein provides a novel and advantageous system and method for determining an individualized communication rate for a user. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for determining a telephone rate for a telephone customer comprising the steps of:

determining at least one frequently called/desirable calling destination;

determining a call percentage for each frequently called/desirable destination;

determine a direct cost for the at least one frequently called/desirable calling destination;

determining a normal margin for the at least one frequently called/desirable calling destination;

determining a margin multiplier for the at least one frequently called/desirable calling destination by replacing the call percentage with the experimental ratio $(e^{(C*FS)}-1)/(e^C-1)$ where e is the irrational base of the natural logarithm, C is the curve constant, and $F_S$ is the call percentage for the selected destination; and multiplying the margin multiplier with the normal margin and adding the result to the direct cost.

2. The method of claim 1 wherein a limit is placed on the margin multiplier.

3. The method of claim 1 wherein the margin multiplier is determined using a two-tier rate plan.

4. The method of claim 1 wherein the margin multiplier is determined using a linear rate.

5. The method of claim 1 wherein the margin multiplier is determined using a minimum margin multiplier.

6. A system for determining a telephone rate for a user calling a desirable destination via a destination gateway provider, the system comprising:

a user calling pattern module for storing information relating to the user;

a destination gateway provider information module for storing information from the destination gateway provider;

a margin multiplier calculator module for determining a margin multiplier for a call to the desirable destination by replacing a call percentage with the experimental ratio $(e^{(C*FS)}-1)/(e^C-1)$ where e is the irrational base of the natural logarithm, C is the curve constant, and $F_S$ is the call percentage for the selected destination; and an individual vote calculator module for determining a rate for calling the desirable destination.

7. A system for determining a telephone rate for a telephone customer comprising:

means for determining at least one frequently called/desirable calling destination;

means for determining a call percentage for each frequently called/desirable destination;

means for determine a direct cost for the at least one frequently called/desirable calling destination;

means for determining a normal margin for the at least one frequently called/desirable calling destination;

means for determining a margin multiplier for the at least one frequently called/desirable calling destination by replacing the call percentage with the experimental ratio $(e^{(C*FS)}-1)/(e^C-1)$ where e is the irrational base of the natural logarithm, C is the curve constant, and $F_S$ is the call percentage for the selected destination; and means for multiplying the margin multiplier with the normal margin and adding the result to the direct cost.

* * * * *